United States Patent [19]

Bowen

[11] 4,264,825

[45] Apr. 28, 1981

[54] FILM SPLICE DETECTOR SYSTEM

[75] Inventor: Howard Bowen, Wilmette, Ill.

[73] Assignee: Research Technology, Inc., Lincolnwood, Ill.

[21] Appl. No.: 23,307

[22] Filed: Mar. 23, 1979

[51] Int. Cl.³ .............................................. G01N 21/86

[52] U.S. Cl. ..................................... 250/560; 356/383

[58] Field of Search ............... 250/560, 570, 571, 572; 356/237, 381, 382, 383, 384, 385, 386, 387

[56] References Cited

U.S. PATENT DOCUMENTS

| | | | |
|---|---|---|---|
| Re. 28,025 | 5/1974 | Murata et al. . | |
| 3,349,905 | 10/1967 | Crawford | 250/560 |
| 3,778,802 | 12/1973 | Wallace . | |
| 3,856,414 | 12/1974 | Menary | 356/237 |
| 4,088,411 | 5/1978 | Ahlquist et al. | 356/383 |
| 4,166,700 | 9/1979 | Bowen et al. | 250/560 |

*Primary Examiner*—David C. Nelms

*Attorney, Agent, or Firm*—Hill, Van Santen, Steadman, Chiara & Simpson

[57] ABSTRACT

A film detector system is provided for detecting film splices or other surface abnormalities longer than a desired length. A film support member is provided over which a strip of film travels which is to be analyzed. First and second light beams are projected parallel with the film surface across the film such that thickness increases due to surface abnormalities on the film intercept portions of the light beam. As a result a shadow is cast on first and second light detectors. The first and second light beams are spaced from one another such that when a film splice or other abnormality intercepts one of the light beams, the other light beam is not simultaneously intercepted if the film splice or abnormality is of normal length but will be intercepted simultaneously if the film splice is of abnormal length. Outputs from the first and second light detectors are compared and the film travel is stopped when the signal is simultaneously received from each of the light detectors.

7 Claims, 5 Drawing Figures

FILM SPLICE DETECTOR SYSTEM

BACKGROUND OF THE INVENTION

1. Field of the Invention

This invention relates to film thickness detector systems and more particularly to such systems which detect a splice or other abnormality on the surface of a film longer than a desired length.

2. Description of the Prior Art

It is known to provide a sensing arm biased against the surface of a film to detect film thickness changes. When an abnormal splice passes under the sensing arm a switching curcuit is activated to stop the travel of the film.

In U.S. Pat. No. 3,778,802, splices longer than a predetermined length are sensed by a single feeler arm which cooperates with a timing circuit which senses the beginning and end of the splice. If the time between the beginning and end of the sensed splice is longer than the time established within the circuitry, then the film travel is stopped. Such a system has the disadvantage of using a mechanical sensing arm. Furthermore, in the system of U.S. Pat. No. 3,778,802 an additional timing circuit is required.

SUMMARY OF THE INVENTION

It is an object of the present invention to provide a film splice detector system which utilizes light sensing members to provide a rapid and reliable response to the presence of abnormally long splices.

It is a further object of this invention to provide a pair of light sensing members spaced a predetermined distance related to the length of splices being detected.

A film detector system of this invention adapted for detecting film splices or other abnormalities of undesired length on the surface of the film has a film support member over which a strip of film travels. First and second light members are provided adjacent the film support member respectively comprising first and second light sources for projecting first and second light beams parallel to the surface of the film strip such that thicker portions of the film intercept portions of the light beam. This causes a shadow to be cast on first and second light detectors of the first and second light sensing detector members. The first and second light beams are spaced from one another a distance slightly shorter than the length of an undesirable film splice or other surface abnormality of undesirable length. When an abnormal film splice passes through the two light beams, signals are simultaneously transmitted from the two light detectors. These signals are separately amplified and applied to a threshold detector for screening out noise and/or for relative adjustment of the two signal strengths with respect to one another. The signals are then connected to an AND gate which produces an output when the two light beams are simultaneously intercepted. The output from the AND gate triggers a switching circuit which activates an indicator light and/or causes a halt in the film travel.

DESCRIPTION OF THE PREFERRED EMBODIMENTS

Figure 1:
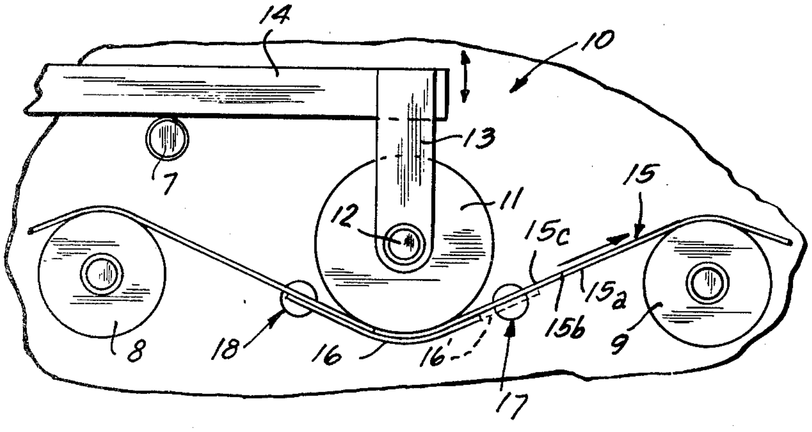
FIG. 1 is a side view of the film detecting station of this invention for detecting film splices or other surface abnormalities longer than a desired length on a film surface.
Figure 2:
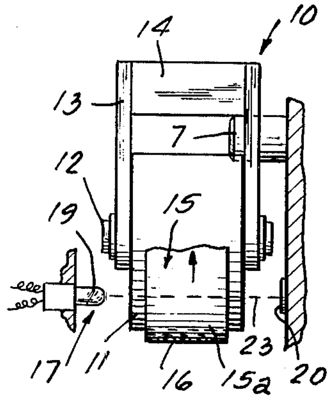
FIG. 2 is a front view of the film detector of FIG. 1.
Figure 3:
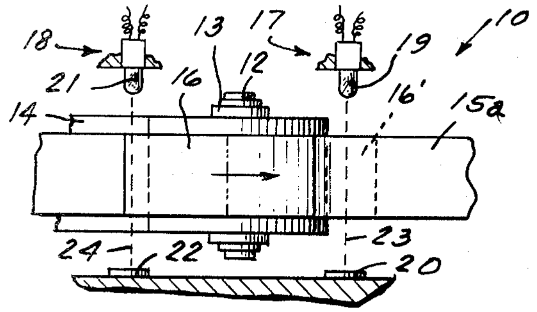
FIG. 3 is a bottom view of the detector of FIG. 1.

One embodiment of a film splice detector station of this invention is illustrated at 10 in FIGS. 1, 2 and 3. A flat roller 11 is mounted by an axle 12 on a movable arm 14. Film 15 such as motion picture film, tape recorder film, or the like is supported by first and second rollers 8 and 9. In a down position of the movable arm 14, the flat roller 11 is biased against a top surface 15*c* of the film 15. A stop member 7 abuts against the arm 14 to position the roller 11 in an operating position. In such an operating position, the film strip intercepts portions of the first and second light beams 23 and 24 of first and second light sensing thickness detectors 17 and 18, respectively. The first thickness detector has a first light source 19 which directs the first beam of light 23 across the film where it is detected by a first photo detector 20. Similarly, a second light source 21 projects a second light beam 24 across the film where it is received by a second photo detector 22. The first and second light beams 23 and 24 are in one embodiment of this invention parallel to the film surface and perpendicular to the lengthwise axis of film travel at the point of interception between the light beams and the film. Consequently, a shadow is cast in relation to the film thickness upon the photo detectors.

The light beams 23 and 24 are spaced from one another a distance slightly longer the length of a normal film splice 16 on a surface 15*a* of the film. Consequently, when a film splice 16 passes through the two light beams, a signal corresponding to the increased thickness of the film due to the film splice will occur in only one of the photo detectors at any given moment. However, if an abnormally long defective film splice such as 16′ passes the light sensing detectors 17 and 18, during some portion of the travel time of the film, signals corresponding to the increased thickness will be simultaneously emitted from both photo detectors 20 and 22. This results since the spacing between the light beams is less than the length of the abnormally long splice.

Figure 4:
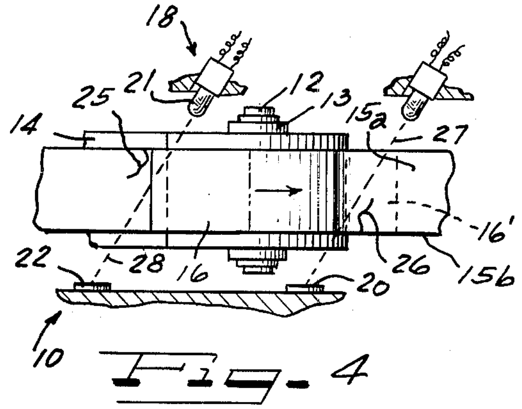
FIG. 4 is a bottom view of an alternate embodiment of the film detector station of FIG. 1.

An alternate embodiment of the film splice detector station is shown in FIG. 4. Since edge tears such as 25 or 26 may occur along the film strip, it is desirable that such tears do not intercept portions of the light beam since a false indication of an increased thickness change due to a tape splice would erroneously occur. Consequently, to reduce this problem, first and second light beams such as 27 and 28 are directed parallel to the surface 15*a* of the film but at an angle of less than 90° with respect to the longitudinal axis of the film at the point of interception. With such an arrangement, the interference caused by tears such as 25 or 26 on an edge 15*b* is not as great as with a perpendicular light beam.

Figure 5:
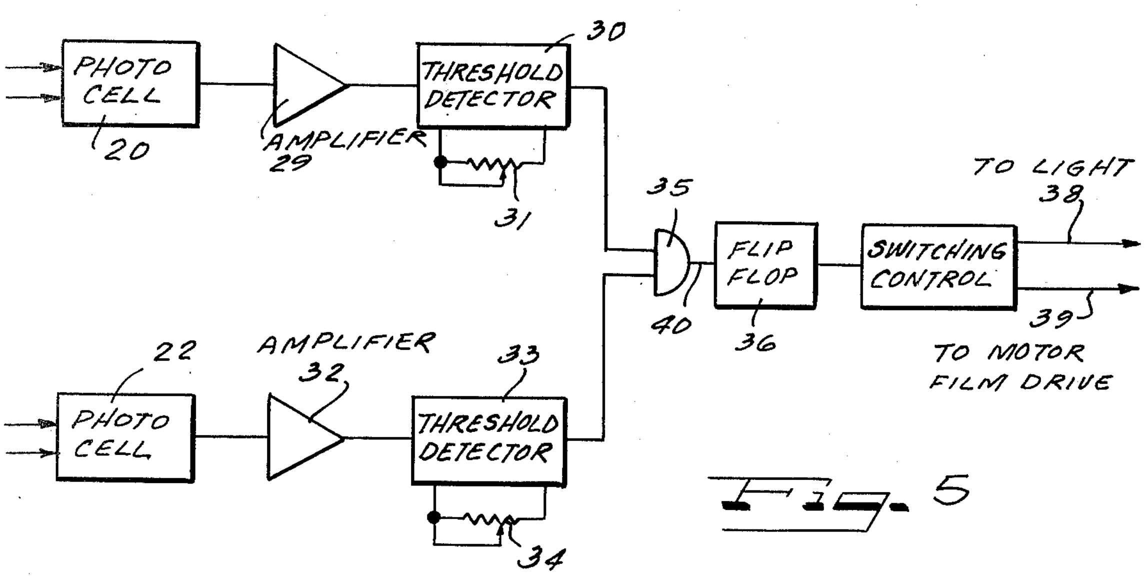
FIG. 5 is a block diagram illustrating a control system connecting with the film splice detector of FIGS. 1 through 4.

The control circuitry for the film splice detector system of this invention is shown in FIG. 5. A photocell 20 receiving the first light beam 23 is modulated by thickness changes on the surface of the film. Photocell 20 connects with an amplifier 29 which may preferably be embodied as an operational amplifier using a National Semiconductor IC type LM3900. The output of the amplifier 29 connects with an input of a threshold detector 30 having a threshold level adjustment 31. The threshold detector 30 permits alignment of the overall system and also eliminates noise problems caused by thickness variations on the surface of the film which are less than the thickness of the film splice or other undesired surface abnormality. Such a detector may also be embodied as an IC using, for example, a National Semiconductor type LM3900.

In similar manner, the output from the photocell 22, which receives light from the second light beam 24, is amplified in an amplifier 32 and coupled to a threshold detector 33 having an adjustment 34. The two outputs from the threshold detectors 30 and 33 are connected to inputs of an AND gate 35 which produces an output signal when signals are simultaneously received from the two threshold detectors. Such an output signal from the AND gate triggers a flip-flop 36 which may be embodied with any of a number of well known IC devices. When the flip-flop 36 is triggered into one of its bi-stable states by the output from the AND gate, a switching control circuit 37 may be used to activate an indicator light 38 or stop the film travel by an appropriate signal to a film drive motor at 39.

In summary, when a film splice longer than normal length causes simultaneous signals in the two photocells 20 and 22, such signals are amplified and processed through separate threshold detectors. The two simultaneous signals activate an AND gate which sets a flip-flop which in turn may light an indicator and/or halt the film travel.

Although various minor modifications may be suggested by those skilled in the art, it should be understood that I wish to embody within the scope of the patent warranted hereon, all such embodiments as reasonably and properly come within the scope of my contribution to the art.

I claim as my invention:

1. A film splice detector system adapted for detecting film splices of abnormal length, comprising:

a film support means over which a strip of film travels;

a first light sensing film thickness detector means having a first light detector and a first light source to one side of the film support means for projecting a first light beam parallel to a surface of the film from one side edge of the film to the opposite side edge;

said first light beam being positioned such that a portion of said light beam is intercepted by a first portion of the film to cast a shadow on said first light detector in relation to a thickness of the film first portion;

a second light sensing film thickness detector means having a second light detector and a second light source on the opposite side of the film support means for projecting a second light beam parallel to said surface of the film from one side edge of the film to the opposite side edge;

said second light beam being positioned such that a portion of said second light beam is intercepted by a second portion of the film to cast a shadow on said second light detector in relation to a thickness of the film second portion;

said first and second light beams being spaced from one another such that when a film splice intercepts one of the light beams the other light beam is not simultaneously intercepted if the film splice is of normal length but will be intercepted simultaneously if the film splice is of abnormal length; and circuit means for comparing outputs from the first and second light detectors and providing a control signal when a film splice of abnormal length is detected.

2. The detector system of claim 1 in which said light beams are perpendicular to a longitudinal axis of the film at the respective intercepted portions.

3. The detector system of claim 1 in which said light beams form an angle of less than 90° with respect to a longitudinal axis of the film at the respective intercepted portions.

4. The detector system of claim 1 in which said film support means comprises a flat roller.

5. The detector system of claim 1 in which said first and second light beams are on opposite sides of a point of contact between the strip of film and the film support means.

6. The detector system of claim 1 in which said circuit means comprises first and second amplifiers respectively connecting to the first and second light detectors, first and second threshold detectors connecting to the respective first and second amplifiers, an AND gate having its inputs connected to the first and second threshold detectors, and a switching means triggered by an output from the AND gate to provide the control signal to means for stopping film travel.

7. The detector system of claim 1 in which said film support means comprises a cylindrical member mounted on movable arm means for biasing the cylindrical member against the film strip, said film strip being supported against said biasing by two additional cylindrical members, stop means being provided for positioning the movable arm means such that said light beams are intercepted by the film strip.

* * * * *